United States Patent
Dai et al.

(10) Patent No.: US 11,726,749 B2
(45) Date of Patent: Aug. 15, 2023

(54) CHILD APPLICATION DEVELOPMENT METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Wenliang Dai, Shenzhen (CN); Canhui Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/320,027

(22) Filed: May 13, 2021

(65) Prior Publication Data

US 2021/0271456 A1 Sep. 2, 2021

Related U.S. Application Data

(63) Continuation of application No. PCT/CN2020/080490, filed on Mar. 20, 2020.

(30) Foreign Application Priority Data

Apr. 9, 2019 (CN) .......................... 201910281384.1

(51) Int. Cl.
 *G06F 8/33* (2018.01)
 *G06F 8/36* (2018.01)
(52) U.S. Cl.
 CPC . *G06F 8/33* (2013.01); *G06F 8/36* (2013.01)
(58) Field of Classification Search
 CPC ..................................... G06F 8/33; G06F 8/36
 See application file for complete search history.

(56) References Cited

U.S. PATENT DOCUMENTS

2010/0107136 A1* 4/2010 Fildebrandt ............... G06F 8/20
 717/105
2012/0110560 A1 5/2012 Fisher et al.
(Continued)

FOREIGN PATENT DOCUMENTS

| CN | 107957911 A | 4/2018 |
| CN | 108647028 A | 10/2018 |
| CN | 108920366 A | 11/2018 |

OTHER PUBLICATIONS

Hyeonsu Kang et al., "Omnicode: A Novice-Oriented Live Programming Environment with Always-On Run-Time Value Visualizations," 2017 [retrieved on Nov. 4, 2022], Proceedings of the 30th Annual ACM Symposium on User Interface Software and Technology, pp. 737-745, downloaded from <url>:https://dl.acm.org. (Year: 2017).*

(Continued)

*Primary Examiner* — S. Sough
*Assistant Examiner* — Stephen D Berman
(74) *Attorney, Agent, or Firm* — ArentFox Schiff LLP

(57) ABSTRACT

This disclosure includes a child application development method. In the method, an interface of a child application developer tool is displayed. The child application developer tool is a native child application developer tool of a first parent application that is configured with an extension corresponding to development processing for a child application of a second parent application. A development instruction for the child application of the second parent application is received via the interface. In response to the development instruction, a child application base library of the second parent application is obtained via the child application developer tool. A child application running environment of the second parent application is created by loading the child application base library. Further, develop- (Continued)

ment processing for the child application of the second parent application is performed in the child application running environment.

20 Claims, 7 Drawing Sheets

(56) References Cited

U.S. PATENT DOCUMENTS

| | | | | |
|---|---|---|---|---|
| 2012/0174058 A1* | 7/2012 | Winkler | .................... | G06F 8/33 |
| | | | | 717/105 |
| 2014/0047413 A1* | 2/2014 | Sheive | ...................... | G06F 8/33 |
| | | | | 717/110 |
| 2014/0359573 A1* | 12/2014 | Ajith Kumar | ............ | G06F 8/70 |
| | | | | 717/113 |

OTHER PUBLICATIONS

Ye Ce et al., "EasyPAB: An Extensible IDE Framework for Parallel Applications," 2007 [retrieved on Mar. 11, 2023], APPT 2007: Advanced Parallel Processing Technologies pp. 666-667, downloaded from <url>:https://link.springer.com. (Year: 2007).*

International Search Report issued in PCT/CN2020/080490 dated May 14, 2020, with English Translation, (5 pages).

Written Opinion issued in PCT/CN2020/080490 dated May 14, 2020 (3 pages).

* cited by examiner

US 11,726,749 B2

CHILD APPLICATION DEVELOPMENT METHOD AND APPARATUS, COMPUTER DEVICE, AND STORAGE MEDIUM

RELATED APPLICATIONS

This application is a continuation of International Application No. PCT/CN2020/080490, entitled "SUB-APPLICATION DEVELOPMENT METHOD, APPARATUS, COMPUTER DEVICE, AND STORAGE MEDIUM" and filed on Mar. 20, 2020, which claims priority to Chinese Patent Application No. 201910281384.1, entitled "CHILD APPLICATION DEVELOPMENT METHOD AND APPARATUS, COMPUTER DEVICE, AND STORAGE MEDIUM" and filed on Apr. 9, 2019. The entire disclosures of the prior applications are hereby incorporated by reference in their entirety.

FIELD OF THE TECHNOLOGY

This disclosure relates to the field of computer technologies, including a child application development method and apparatus, a computer device, and a storage medium.

BACKGROUND OF THE DISCLOSURE

With the rapid development of science and technology, a large number of advanced technologies are constantly emerging. Mini program is a new technology and product form. The so-called mini program is an application that can be used without being downloaded and installed. Developers may develop corresponding mini programs for applications of a terminal. The application of the terminal may be any application run on an operating system of the terminal. The mini programs may be embedded in the applications of the terminal as child applications. More diversified services may be provided for users by running child applications (e.g., corresponding mini programs) in the applications. Developers of the mini programs may use developer tools to develop the mini programs.

In related technologies, to develop a mini program corresponding to an application of a terminal, a developer of the mini program needs to develop a dedicated developer tool for the application, and then use the dedicated developer tool to develop the mini program corresponding to the application. In this case, a large quantity of man power and device resources need to be consumed to develop the mini program, resulting in relatively high costs.

SUMMARY

In view of the above, a child application development method and apparatus, a computer device, and a non-transitory computer-readable storage medium are provided, that can lower costs of developing a mini program.

A child application development method is provided. In the method, an interface of a child application developer tool is displayed. The child application developer tool is a native child application developer tool of a first parent application that is configured with an extension corresponding to development processing for a child application of a second parent application. The second parent application is different from the first parent application. A development instruction for the child application of the second parent application is received via the interface. In response to the development instruction, a child application base library of the second parent application is obtained via the child application developer tool. A child application running environment of the second parent application is created by loading the child application base library. Further, development processing for the child application of the second parent application is performed in the child application running environment A child application development apparatus is provided. The apparatus includes processing circuitry that is configured to display an interface of a child application developer tool. The child application developer tool is a native child application developer tool of a first parent application that is configured with an extension corresponding to development processing for a child application of a second parent application, the second parent application being different from the first parent application. The processing circuitry is configured to receive a development instruction for the child application of the second parent application via the interface, and obtain, in response to the development instruction, a child application base library of the second parent application via the child application developer tool. The processing circuitry is configured to create a child application running environment of the second parent application by loading the child application base library. Further, the processing circuitry is configured to perform development processing for the child application of the second parent application in the child application running environment.

A computer device is provided, including a memory and a processor, the memory storing a computer program, the computer program, when executed by the processor, causing the processor to perform the following operations. An interface of a child application developer tool is displayed. The child application developer tool is a native child application developer tool of a first parent application that is configured with an extension corresponding to development processing for a child application of a second parent application. The second parent application is different from the first parent application. A development instruction for the child application of the second parent application is received via the interface. In response to the development instruction, a child application base library of the second parent application is obtained via the child application developer tool. A child application running environment of the second parent application is created by loading the child application base library. Further, development processing for the child application of the second parent application is performed in the child application running environment.

A non-transitory computer-readable storage medium is provided. The medium stores instructions which when executed by a processor cause the processor to perform the following operations. An interface of a child application developer tool is displayed. The child application developer tool is a native child application developer tool of a first parent application that is configured with an extension corresponding to development processing for a child application of a second parent application. The second parent application is different from the first parent application. A development instruction for the child application of the second parent application is received via the interface. In response to the development instruction, a child application base library of the second parent application is obtained via the child application developer tool. A child application running environment of the second parent application is created by loading the child application base library. Further, development processing for the child application of the second parent application is performed in the child application running environment.

According to the child application development method and apparatus, the computer device, and the storage medium described above, when a child application of a second parent application is developed, customized extension is performed on an existing child application developer tool of another application (e.g., a first parent application), to obtain a child application developer tool of the second parent application, a child application base library of the second parent application is obtained by using the child application developer tool, and further, a running environment is provided for the child application of the second parent application by loading the child application base library, to implement development processing for the child application of the second parent application based on the running environment. Therefore, it is unnecessary to develop a native child application developer tool for the second parent application again, thereby reducing costs.

DESCRIPTION OF EMBODIMENTS

To make the objectives, technical solutions, and advantages of this disclosure clearer, the following further describes this disclosure in detail with reference to the accompanying drawings and the embodiments. It is to be understood that the specific embodiments described herein are merely used to explain this disclosure and are not intended to limit the scope of this disclosure.

Figure 1:
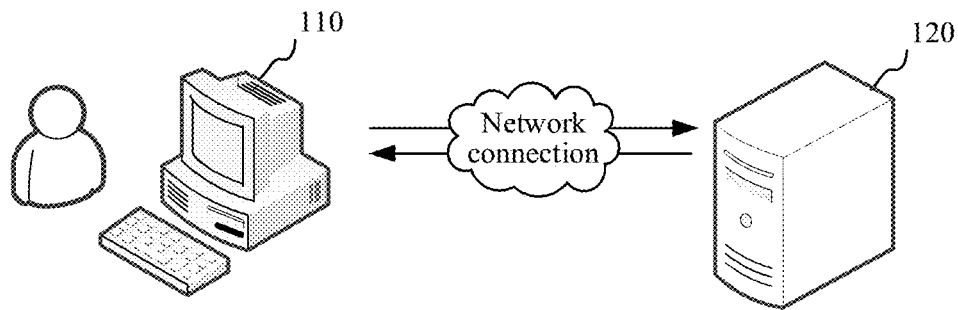
FIG. 1 is a diagram of an application scenario of a child application development method according to an embodiment.

FIG. 1 is a diagram of an application scenario of a child application development method according to an embodiment. Referring to FIG. 1, the application scenario includes a terminal 110 and a server 120. The terminal 110 may be a smart TV, a smart speaker, a desktop computer, or a mobile terminal, and the mobile terminal may include at least one of a mobile phone, a tablet computer, a notebook computer, a personal digital assistant, and a wearable device. The server 120 may be implemented by an independent server or a server cluster that includes a plurality of physical servers.

The server 120 may store a child application developer tool. The terminal 110 may download the child application developer tool locally from the server 120. The terminal 110 may display an interface of the child application developer tool locally at the terminal 110. The child application developer tool is obtained by performing customized extension on a native child application developer tool of a first parent application. The customized extension is related to development processing for a child application of a second parent application. The second parent application is different from the first parent application. The terminal 110 may receive a development trigger instruction for the child application of the second parent application through the interface, and obtain, in response to the development trigger instruction, a child application base library of the second parent application by using the child application developer tool. The terminal 110 may create a child application running environment of the second parent application by loading the child application base library, and perform development processing for the child application of the second parent application in the child application running environment.

When a child application is run, an interface provided by a parent application or an interface provided by an operating system needs to be called. A child application base library describes software or an instruction that needs to be executed when a child application is run, and a corresponding interface may be called by executing the software or the instruction, to implement a function of the child application. Therefore, a child application running environment may be created by loading the child application base library. The child application running environment may be considered as a running platform of the child application, and the child application running environment provides the software or the instruction that needs to be executed when the child application is run, thereby providing a function of calling an interface. The child application may call a corresponding interface to implement a function of the child application.

In another embodiment, the server 120 may not directly store the child application developer tool after the customized extension, and instead, stores the native child application developer tool of the first parent application. The terminal 110 may download a native child application developer tool of the first parent application locally from the server 120, and perform customized extension corresponding to development processing for the child application of the second parent application on the native child application developer tool, to obtain a child application developer tool after the customized extension. The terminal 110 further displays the child application developer tool after the customized extension.

Figure 2:
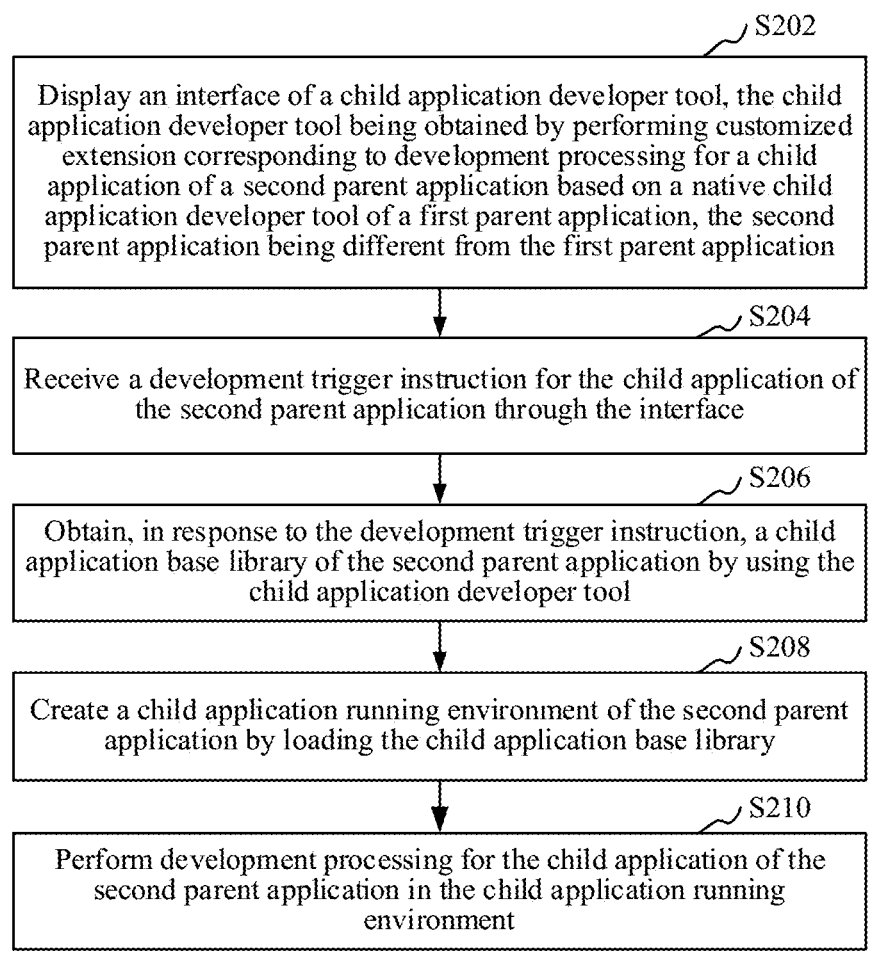
FIG. 2 is a schematic flowchart of a child application development method according to an embodiment.

FIG. 2 is a schematic flowchart of a child application development method according to an embodiment. This embodiment is mainly described by using an example in which the child application development method is applied to a computer device. The computer device may be the terminal 110 in FIG. 1. Referring to FIG. 2, the method may include the following steps.

In step S202, an interface of a child application developer tool is displayed, the child application developer tool being obtained by performing customized extension corresponding to development processing for a child application of a second parent application based on a native child application developer tool of a first parent application, the second parent application being different from the first parent application.

The child application developer tool is a developer tool for developing and debugging a child application. The developer tool (e.g., an integrated development environment (IDE)) is a type of application software for assisting in developing a computer program. The child application developer tool may be configured to provide a visual operating interface, to help a developer to complete the research and development of a child application.

A child application is an application program that can be implemented in an environment provided by a parent application. In an embodiment, a child application may be a mini program, an official account, or the like in a parent application. A parent application is an application program carrying a child application and provides an environment for implementation of the child application. The parent application is a native application program. The native application is an application that may be directly run on the operating system.

In this embodiment, the child application developer tool in step S202 is obtained by performing customized extension on a native child application developer tool of a first parent application. The customized extension is an extension corresponding to development processing for a child application of a second parent application. That is, the child application developer tool is obtained by performing customized extension corresponding to development processing for a child application of a second parent application for a native child application developer tool of a first parent application.

A native child application developer tool of the first parent application is a tool that is not modified through extension and that is dedicated to developing a child application of the first parent application.

The second parent application is different from the first parent application, that is, the second parent application is a third-party application other than the first parent application.

The customized extension corresponding to development processing for a child application of a second parent application means that expansion that can meet a personalization requirement of the child application of the second parent application is performed based on the native child application developer tool of the first parent application. That is, a personalization function of the child application of the second parent application is added to the native child application developer tool of the first parent application. It may be understood that, only the child application of the second parent application developed based on the extended child application developer tool can be adapted to the second parent application, to be implemented in an environment provided by the second parent application.

In an embodiment, the second parent application is at least one parent application. That is, the child application developer tool may be obtained by performing customized extension corresponding to development processing for a child application of at least one second parent application based on a native child application developer tool of a first parent application. That is, customized extension corresponding to one or more second parent applications may be performed in the native child application developer tool.

For example, the first parent application is A, the native child application developer tool is $IDE_1$, and corresponding child applications need to be developed respectively for second parent applications B and C. Both expansion corresponding to development processing for a child application of B and expansion corresponding to development processing for a child application of C are performed in the native child application developer tool $IDE_1$, to obtain a developer tool $IDE_2$. In this way, development processing for the child application of B may and development processing for the child application of C can be implemented based on $IDE_2$.

In an embodiment, the first parent application and the second parent application may be any one of a social application program, a dedicated application program specially supporting the child application, a file management application program, an email application program, a game application program, or the like. The social application includes an instant messaging application, a social network service (SNS), a live broadcast application, or the like. It may be understood that, this is only for exemplary description, and is not intended to limit types of the first parent application and the second parent application. Any parent application in which a child application needs to be developed may be the first parent application or the second parent application.

The second parent application being different from the first parent application does not define that the types of the first parent application and the second parent application are different. The second parent application and the first parent application may alternatively be different applications of the same type. It may be understood that, the computer device may perform customized extension on the native child application developer tool of the first parent application in a manner of adding a plug-in. The manner of adding a plug-in is to dynamically and flexibly perform customized extension on the native child application developer tool of the first parent application. The developer may alternatively edit the native child application developer tool of the first parent application, to perform customized extension on the native child application developer tool. This manner is permanent extension. That is, a new child application developer tool is developed based on the native child application developer tool of the first parent application. That is, content of the customized extension is a part of the child application developer tool, and is not strippable plug-in content any more.

The computer device may run the child application developer tool, to further display an interface of the child application developer tool.

In an embodiment, in response to a new and complete child application developer tool being obtained by editing the native child application developer tool of the first parent application, the computer device may directly download the child application developer tool from a server. Further, the computer device may run the downloaded child application developer tool, to display the interface of the child application developer tool.

In another embodiment, in response to the child application developer tool being obtained by performing customized extension in a manner of adding a plug-in to the native child application developer tool of the first parent application, the computer device may download the native child application developer tool of the first parent application from the server, and then add the plug-in to the native child application developer tool, to obtain the child application developer tool. Further, the computer device may run the child application developer tool, to display the interface of the child application developer tool.

In step S204, a development trigger instruction for the child application of the second parent application is received through the interface.

The development trigger instruction is used for triggering to perform development processing for the child application of the second parent application.

In an embodiment, a user may perform a preset action (e.g., an action or a combination of actions such as a press and a hold, a slide, or a click) for the interface, and the computer device generates a development trigger instruction for the child application of the second parent application after detecting the preset action.

In an embodiment, a development trigger control may further be displayed in the interface, and the computer device may generate a development trigger instruction for the child application of the second parent application when detecting a trigger operation for the development trigger control. The development trigger control is a control configured to trigger development processing for the child application of the second parent application.

In an embodiment, step S204 includes: displaying a mode option set in the interface, the mode option set including an option of a child application development mode of the second parent application; and generating, in response to a selection operation on the option in the mode option set being detected, the development trigger instruction for the child application of the second parent application.

The mode option set includes at least one mode option. The mode option is an option corresponding to a mode. It may be understood that, the child application developer tool provides different environments for different modes. In an embodiment, the mode corresponding to the mode option in the mode option set may include a child application development mode of the second parent application, may further include a child application development mode of the first parent application, may further include a child application test mode of the first parent application, or may further include a child application test mode of the second parent application.

The child application development mode of the second parent application refers to a mode of developing the child application of the second parent application, and is used for providing an environment for developing the child application of the second parent application.

It may be understood that, when there are a plurality of second parent applications, each second parent application has a corresponding child application development mode option. That is, when there is a plurality of second parent applications, the mode option set includes options of child application development modes of the plurality of second parent applications. That is, different second parent applications need to enter corresponding child application development modes through different entries.

For example, if there are second parent applications B and C, the mode option set may include an option of a child application development mode of the second parent application B and an option of a child application development mode of the second parent application C. If a child application of the second parent application B needs to be developed, the option of the child application development mode of the second parent application B needs to be selected. If a child application of the second parent application C needs to be developed, the option of the child application development mode of the second parent application C needs to be selected.

In an embodiment, the mode option set may alternatively include an option of a child application development mode of a parent application other than the second parent application. In an embodiment, the mode option set may alternatively include an option of a child application development mode of the first parent application. In an embodiment, the mode option set may alternatively include a plug-in mode. The plug-in mode is used for providing an environment for developing a plug-in.

In an embodiment, the computer device may display a mode option set in the interface. The user may select an option from the mode option set. The computer device may detect the option selected from the mode option set. If the selected option is the option of the child application development mode of the second parent application, the computer device may generate a development trigger instruction for the child application of the second parent application corresponding to the option.

It may be understood that, the option of the child application development mode of the second parent application is equivalent to a development entry of the child application of the second parent application. After the option is selected, development processing for the child application of the second parent application may be triggered.

It may be understood that, if the mode option set includes options of child application development modes of a plurality of second parent applications, a user may select an option of a child application development mode of a second parent application therefrom, and the computer device may detect the option, and generate a development trigger instruction for a child application of the second parent application corresponding to the option. That is, when an option corresponding to a specific second parent application is selected, generation of a development trigger instruction for a child application of the second parent application is triggered.

In an embodiment, the computer device may directly display the mode option set in the interface of the child application developer tool.

In another embodiment, the computer device may alternatively display a mode selection entry in the interface of the child application developer tool. The mode selection entry is configured to display a mode option set after being triggered. The user may perform a trigger operation on the mode selection entry, and after detecting the trigger operation, the computer device displays the mode option set in the interface of the child application developer tool. In an embodiment, the mode selection entry may be presented in a form of a drop-down box.

Figure 3:
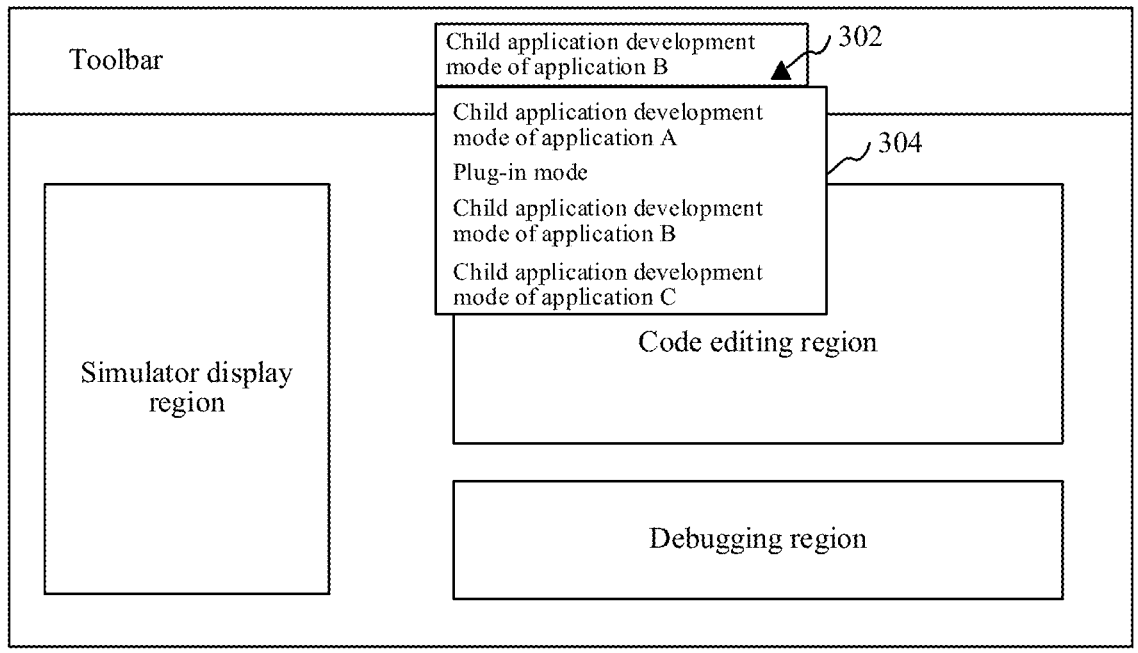
FIG. 3 is a diagram of a display interface of a mode option set according to an embodiment.

For ease of understanding, exemplary descriptions are provided with reference to FIG. 3. FIG. 3 is a diagram of a display interface of a mode option set according to an embodiment. Referring to FIG. 3, the user performs a trigger operation on a mode selection entry 302 in a toolbar to display a mode option set 304. The mode option set 304 includes an option of a child application development mode of a first parent application A, an option of a plug-in mode, and options of child application development modes of a plurality of second parent applications (e.g., the second parent application B and the second parent application C.) In FIG. 3, if a user selects the option of the child application development mode of the second parent application B, the child application developer tool may present a code editing region, a debugging region, and a simulator display region in this mode.

In step S206, in response to the development trigger instruction, a child application base library of the second parent application is obtained by using the child application developer tool.

The child application base library is configured to provide an environment for running a child application.

It may be understood that, a child application base library, that is, a runtime library, describes software/an instruction that is executed when the child application is run, and in particular, an instruction that is critical to normal running of the child application. That is, a child application base library is equivalent to encapsulating capabilities of a third-party client and a mobile terminal to provide an environment for running of the child application.

In an embodiment, in response to the child application developer tool being obtained by editing the native child application developer tool of the first parent application, the computer device may obtain a child application base library of the second parent application from a file of the child application developer tool after receiving the development trigger instruction. In response to the child application developer tool being obtained by adding a plug-in to the native child application developer tool of the first parent application, the computer device may obtain the child application base library of the second parent application from related information of the plug-in after receiving the development trigger instruction. In an embodiment, the related information of the plug-in may be a configuration file of the plug-in.

In an embodiment, the child application base library of the second parent application may have at least one base library version. If the child application base library has a plurality of base library versions, the computer device may obtain a child application base library corresponding to a designated base library version. The computer device may alternatively obtain a child application base library corresponding to a latest base library version by default.

In an embodiment, the interface of the child application developer tool includes a selection entry of the child application base library. In response to the development trigger instruction being received, the computer device may detect a base library version currently designated in the selection entry, and obtain a child application base library corresponding to the base library version currently designated. It may be understood that, a user may perform a trigger operation on the selection entry, to redesignate a base library version, and the computer device may obtain and load, in response to the operation, a child application base library corresponding to the redesignated base library version.

In step S208, a child application running environment of the second parent application is created by loading the child application base library.

The child application running environment is an environment provided for running of the child application of the second parent application.

In an embodiment, the computer device may load the child application base library, to provide a running environment for the child application of the second parent application.

It may be understood that, loading the child application base library is equivalent to injecting a customized child application base library of the second parent application, to provide an environment for running of the child application of the second parent application. That is, the child application of the second parent application is executable in a created child application running environment.

The child application running environment of the second parent application can satisfy running requirements of all child applications of the second parent application. For example, if the second parent application has a plurality of child applications, c1, c2, and c3, in the child application running environment of the second parent application, development processing for the child applications c1, c2, and c3 of the second parent application may be implemented separately.

In step S210, development processing for the child application of the second parent application is performed in the child application running environment.

In an embodiment, the computer device may perform, in response to a development instruction inputted by the user for the child application of the second parent application, development processing, such as development code editing, development code debugging, and program releasing, for the child application of the second parent application in the child application running environment, to develop a child application dedicated to the second parent application.

The development code debugging is implemented by combining code compiling, simulation display, a child application operation, code modification debugging, and the like.

In an embodiment, a development code editing region, a development code debugging region, a child application simulator display region, and the like are integrated in the child application developer tool, so that the user can develop the child application.

Because the customized extension corresponding to development processing for the child application of the second parent application is implemented in the child application developer tool, during development of the child application of the second parent application, personalized processing corresponding to the child application of the second parent application may be further implemented according to information of the customized extension.

According to the foregoing child application development method, when developing a child application of a second parent application, a customized child application base library of the second parent application is obtained by performing customized extension on an existing child application developer tool of another application (e.g., a first parent application), and further a running environment is provided for the child application of the second parent application by loading the child application base library, to implement development processing for the child application of the second parent application based on the running environment. Therefore, it is unnecessary to develop a native child application developer tool for the second parent application again, thereby reducing costs.

In addition, compared with redeveloping a specific child application developer tool for the second parent application, the child application development solution in this embodiment of this disclosure consumes less time, so that the development efficiency of the child application can be improved.

In an embodiment, the child application developer tool is obtained after installing a child application simulator plug-in of the second parent application in the native child application developer tool of the first parent application. In this embodiment, the obtaining a child application base library of the second parent application by using the child application developer tool in step S206 includes: selecting the child application base library of the second parent application from a configuration file of the child application simulator plug-in by using the child application developer tool.

The child application simulator plug-in of the second parent application is configured to implement customized development processing for the child application of the second parent application.

The child application simulator plug-in has a corresponding configuration file, and the configuration file includes the child application base library of the second parent application.

The computer device may select the child application base library of the second parent application from the configuration file of the child application simulator plug-in by using the child application developer tool. The computer device may load the selected child application base library of the second parent application, to create a child application running environment of the second parent application.

It may be understood that, different second parent applications correspond to different child application simulator plug-ins.

For example, a child application simulator plug-in corresponding to the second parent application B is p1, and a child application simulator plug-in corresponding to the second parent application C is p2. p1 and p2 correspond to different configuration files respectively. The configuration file of p1 includes the child application base library of the second parent application B. The configuration file of p2 includes the child application base library of the second parent application C.

In the foregoing embodiment, customized extension is performed on a native child application developer tool of a first parent application in a manner of adding a child application simulator plug-in, so that the child application simulator plug-in and the native child application developer tool can be highly decoupled. In this way, a plurality of types of child applications of a second parent application may be developed through a native child application developer tool by adding different plug-ins, thereby further saving development resources.

In addition, because the child application simulator plug-in and the native child application developer tool are highly decoupled, the child application simulator plug-in may be updated according to its own status without being limited by an update status of the native child application developer tool of the first parent application.

In an embodiment, before step S202, the method further includes: displaying a plug-in management interface provided by the native child application developer tool of the first parent application, the plug-in management interface including an identifier of the child application simulator plug-in of the second parent application; and installing, in response to a trigger operation on the identifier being detected, the child application simulator plug-in corresponding to the identifier to the native child application developer tool.

The plug-in management interface is configured to manage a plug-in. The plug-in management interface includes an identifier of the plug-in. The identifier of the plug-in is a presentation form of the plug-in in the plug-in management interface.

In an embodiment, the identifier of the plug-in in the plug-in management interface may include identifiers of installed and uninstalled plug-ins.

In an embodiment, before step S202, the computer device may run the native child application developer tool of the first parent application, and display the plug-in management interface by using the native child application developer tool of the first parent application, to display the identifier of the plug-in in the plug-in management interface.

In an embodiment, the computer device may display a plug-in management entry in the interface of the native child application developer tool of the first parent application, and display, in response to a trigger operation on the plug-in management entry being detected, the plug-in management interface in the native child application developer tool of the first parent application. The plug-in management entry is configured to display the plug-in management interface after being triggered.

In an embodiment, the plug-in management entry may correspond to a plug-in option in a toolbar. The computer device may display the plug-in option in a toolbar of the native child application developer tool of the first parent application, the plug-in option being corresponding to the plug-in management entry, and trigger, in response to a trigger operation for the plug-in option being detected, a plug-in management entry corresponding to the plug-in option, to trigger display of the plug-in management interface.

The identifier of the plug-in in the plug-in management interface includes an identifier of the child application simulator plug-in of the second parent application. The user may perform a trigger operation on the identifier of the child application simulator plug-in of the second parent application, and the computer device installs, in response to the trigger operation on the identifier being detected, the child application simulator plug-in of the second parent application corresponding to the identifier to the native child application developer tool. Therefore, the customized extension corresponding to development processing for the child application of the second parent application is implemented on the native child application developer tool.

Figure 4:
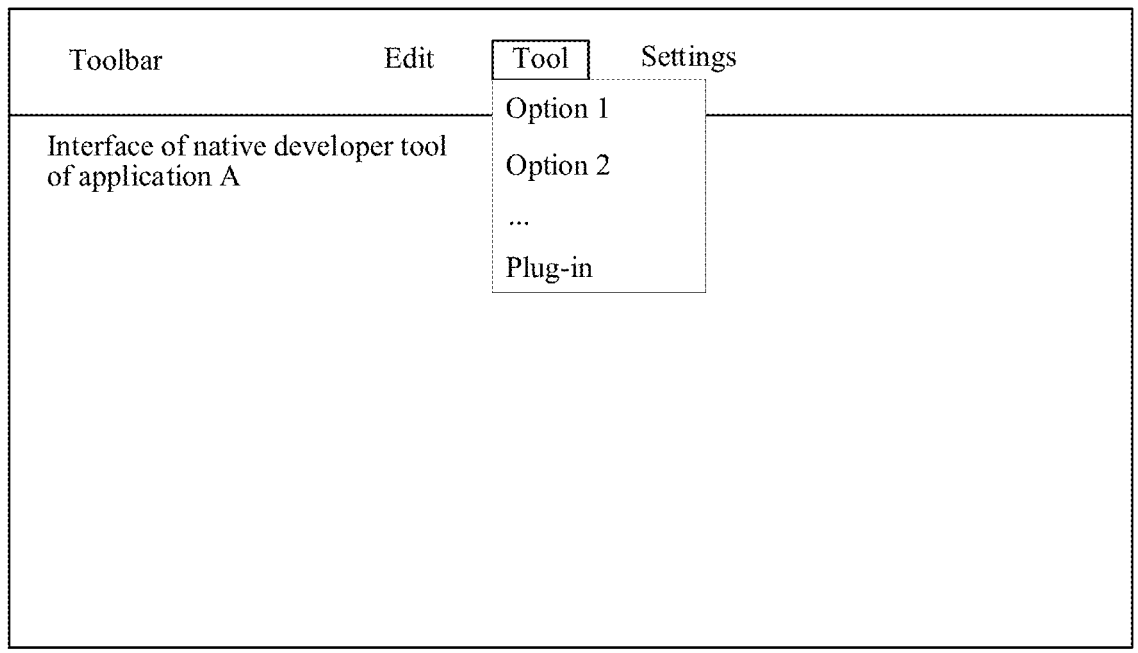
FIG. 4 is a schematic diagram of a plug-in management interface according to an embodiment.
Figure 5:
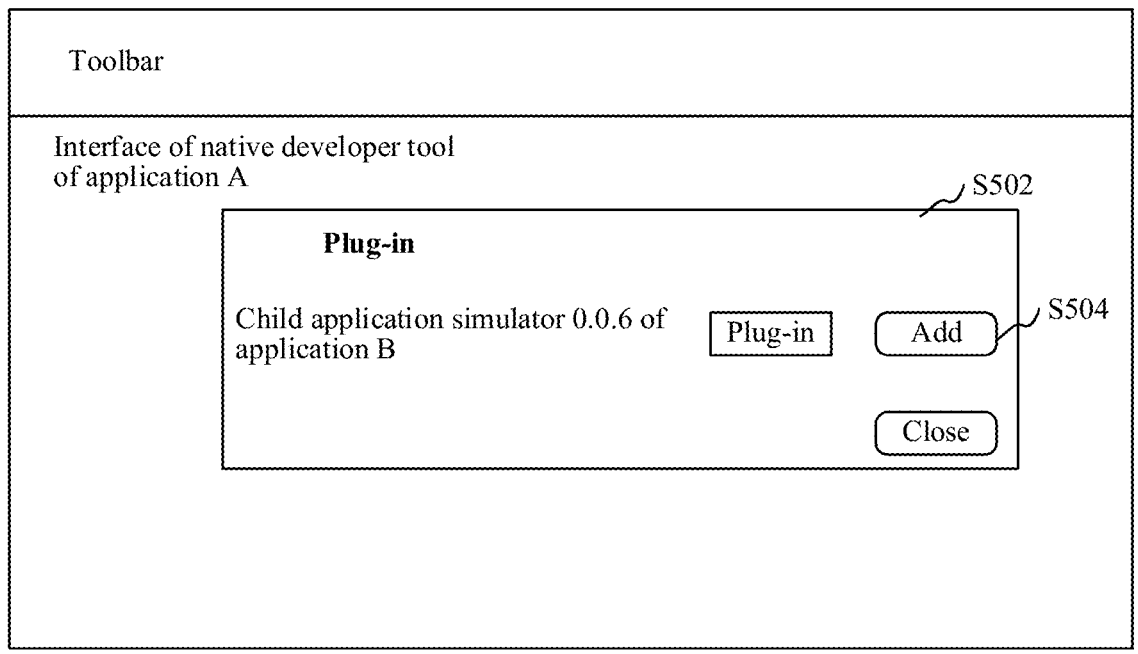
FIG. 5 is a schematic diagram of a plug-in management interface according to another embodiment.

FIG. 4 and FIG. 5 are schematic diagrams of a plug-in management interface according to an embodiment. Referring to FIG. 4, a user may select a "Plug-in" option (e.g., the "plug-in" option is the plug-in management entry) in a "Tool" option in a native child application developer tool interface of the first parent application A, to trigger generation of a plug-in management interface S502 in FIG. 5. The user may perform a trigger operation on an "Add" button S504. That is, a child application simulator plug-in of the second parent application B may be installed in the native child application developer tool of the first parent application.

In an embodiment, the plug-in management interface may include identifiers of child application simulator plug-ins of a plurality of second parent applications. In this case, the installing, in response to a trigger operation on the identifier being detected, the child application simulator plug-in corresponding to the identifier to the native child application developer tool includes: detecting the trigger operation on the identifier of the child application simulator plug-in in the plug-in management interface, to determine an identifier of a child application simulator plug-in to which the trigger operation is directed; and installing the child application simulator plug-in of the second parent application corresponding to the identifier to the native child application developer tool.

In an embodiment, the user may select to trigger an identifier of a child application simulator plug-in corresponding to a second parent application in which a child application needs to be developed, and the computer device may detect the identifier of the child application simulator plug-in to which the trigger operation is directed, and install the child application simulator plug-in of the second parent application corresponding to the identifier to the native child application developer tool.

In the foregoing embodiment, the child application simulator plug-in is selectively added by a developer instead of being written into a developer tool by using code, leading to higher flexibility, so that the child application simulator plug-in, which means an excessively large amount of data to some users, can be prevented from being entirely and fixedly written into the developer tool and causing unnecessary waste of resources.

In an embodiment, the native child application developer tool includes a child application simulator. The child application simulator is configured to simulate performance of the child application currently developed in the second parent application. In this embodiment, step S210 includes: simulating, by using the child application simulator, an interface presented in a simulator display region of the child application developer tool in a case that a child application currently developed is run in the second parent application based on the child application running environment; generating, in response to a preset simulation operation performed for the child application simulator being detected by using the child application simulator plug-in, a simulation interface corresponding to the preset simulation operation by using the child application simulator plug-in; and covering, for display, the simulation interface on the interface of which presentation is simulated.

The child application simulator is configured to simulate real logic performance of a child application currently developed in the second parent application, and for all of a plurality of interfaces, correct states can be presented in the child application simulator. It may be understood that, the child application simulator is equivalent to simulating a state that is presented when a child application is normally run in the second parent application.

The simulator display region is a region configured to display an interface simulated by the child application simulator.

The preset simulation operation is a predesignated operation used for triggering simulation processing.

The simulation interface is an interface displayed through the simulation processing. It may be understood that, the child application simulator plug-in also has a display simulating function. The simulation interface generated by the child application simulator plug-in is a customized interface that can express personalization of the second parent application in addition to the interface presented by the child application simulator.

In an embodiment, the preset simulation operation includes simulating execution of an operation on the second parent application.

In another embodiment, the preset simulation operation may alternatively include simulating an operation of returning to a home page, simulating an operation of returning to a previous interface, and the like.

In an embodiment, the computer device may compile development code through a compiling instruction, simulate, by using the child application simulator, an interface presented in a simulator display region of the child application developer tool in a case that a child application currently developed is run in the second parent application based on the child application running environment.

The computer device may monitor the child application simulator by using the child application simulator plug-in. The user may perform a preset simulation operation on the child application simulator. The computer device may generate, in response to the preset simulation operation being detected by using the child application simulator plug-in, a simulation interface corresponding to the preset simulation operation by using the child application simulator plug-in. The computer device may cover, for display, the simulation interface generated by using the child application simulator plug-in on the simulator display region. That is, the simulation interface generated by the child application simulator plug-in covers the interface of which presentation is simulated by the child application simulator.

In an embodiment, a size of a display region of the child application simulator plug-in is consistent with a size of the child application simulator display region. In this case, the simulation interface can entirely cover the interface of which presentation is simulated by the child application simulator.

In another embodiment, the size of a display region of the child application simulator plug-in may be alternatively different from the size of the child application simulator display region.

In an embodiment, a simulation interface corresponding to a preset simulation operation may be preset in the child application simulator plug-in, and in response to the preset simulation operation being detected, the simulation interface corresponding to the preset simulation operation is obtained and loaded.

In another embodiment, interface generation logic corresponding to the preset simulation operation is already set in the child application simulator plug-in, and in response to the preset simulation operation being detected, the interface generation logic corresponding to the preset simulation operation is called to generate the corresponding simulation interface.

In an embodiment, in response to a display end instruction for the simulation interface being detected by using the child application simulator plug-in, display of the simulation interface is stopped by using the child application simulator plug-in.

The display end instruction is used for instructing display of the simulation interface to end. It may be understood that, the user may select a button (e.g., a "Return" button or a "Hide" button) configured to trigger to end display in the simulation interface, and the computer device may generate a display end instruction after detecting the operation.

In an embodiment, the computer device may hide the simulation interface by using the child application simulator plug-in, for example, may set the simulation interface to a non-display state. In another embodiment, the computer device may alternatively remove the simulation interface by using the child application simulator plug-in, to end displaying the simulation interface.

Figure 6:
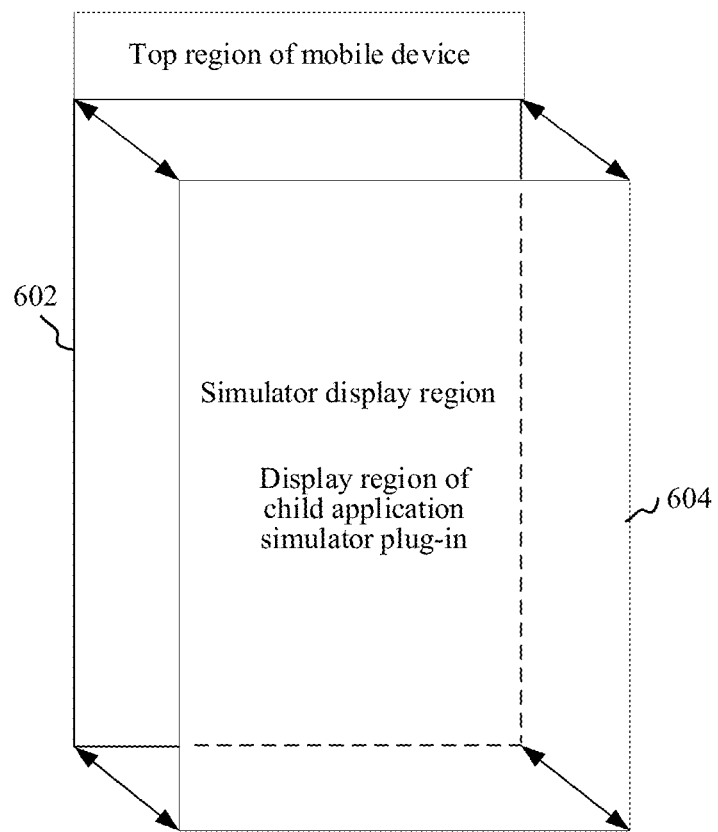
FIG. 6 is a schematic diagram of display of a child application simulator plug-in according to an embodiment.

FIG. 6 is a schematic diagram of display of a child application simulator plug-in according to an embodiment. Referring to FIG. 6, the child application simulator plug-in covers over a simulator display region 602 in the child application developer tool in a form of a view, and a size of a display region 604 of the child application simulator plug-in is consistent with a size of the simulator display region 602. It may be understood that, the interface presented through a display region of the child application simulator plug-in may be displayed or hidden correspondingly according to a detected action acting on the child application simulator. If the interface presented by the child application simulator plug-in is hidden, an interface simulated by the child application simulator is presented in the interface of the child application developer tool.

In the foregoing embodiment, a customized and personalized interface of the second parent application is displayed by using the child application simulator plug-in. In addition, the child application simulator plug-in has a customized monitoring function, and can be displayed when necessary according to its own requirements, thereby improving the flexibility and accuracy of display.

In an embodiment, the preset simulation operation includes simulating execution of an operation on the second parent application. In this embodiment, the generating, in response to a preset simulation operation performed for the child application simulator being detected, a simulation interface corresponding to the preset simulation operation by using the child application simulator plug-in includes: simulating, in response to the simulating execution of the operation on the second parent application being detected by using the child application simulator plug-in, display of an interface of the second parent application corresponding to the detected operation by using the child application simulator plug-in.

The simulating execution of the operation on the second parent application is simulating an operation performed on the second parent application. It may be understood that, different operations of which execution is simulated may correspond to different interfaces of the second parent application of which presentation is simulated.

In an embodiment, the interface of the child application simulator includes a simulation operation entry, and the user may perform a trigger operation on the simulation operation entry, to trigger to display a simulation operation option set. The simulation operation option set includes an option of simulating execution of an operation on the second parent application. The user may trigger the option of simulating execution of an operation on the second parent application, to simulate execution of an operation on the second parent application. The computer device may monitor, application by using the child application simulator plug-in, the simulating execution of the operation on the second parent application, and simulate display of an interface of the second parent application corresponding to the detected operation by using the child application simulator plug-in.

It may be understood that, the simulation operation option set may alternatively include other simulation operation options. The other simulation operation options may include at least one of an option of simulating an operation of returning to a previous interface, an option of simulating an operation of returning to a home page, and the like.

In an embodiment, the second parent application may be an enterprise instant messaging client. The simulating execution of the operation on the second parent application includes simulating execution of an enterprise selection operation on the enterprise instant messaging client Therefore, the simulation operation option set may include an option of simulating execution of the enterprise selection operation of the enterprise instant messaging client. In this embodiment, in response to the simulating execution of the enterprise selection operation on the enterprise instant messaging client being detected, display of an enterprise selection interface corresponding to the enterprise selection operation is simulated by using the child application simulator plug-in.

The enterprise selection interface is a simulation interface used for selecting an enterprise. At least one enterprise account is presented in the enterprise selection interface. The enterprise account may be an identifier used for determining the enterprise, may be an account registered by the enterprise on the enterprise instant messaging client, or may be an enterprise name or the like.

It may be understood that, when the enterprise selection interface includes a plurality of enterprise accounts, the user may perform a selection switching operation on the enterprise accounts presented in the enterprise selection interface, and the computer device may perform switching between enterprise accounts according to the switching operation.

In an embodiment, the enterprise selection interface further includes a child application return entry. The child application return entry is used for returning, after being triggered, to simulating an interface presented when a child application currently developed is run in the second parent application based on the child application running environment.

Figure 7:
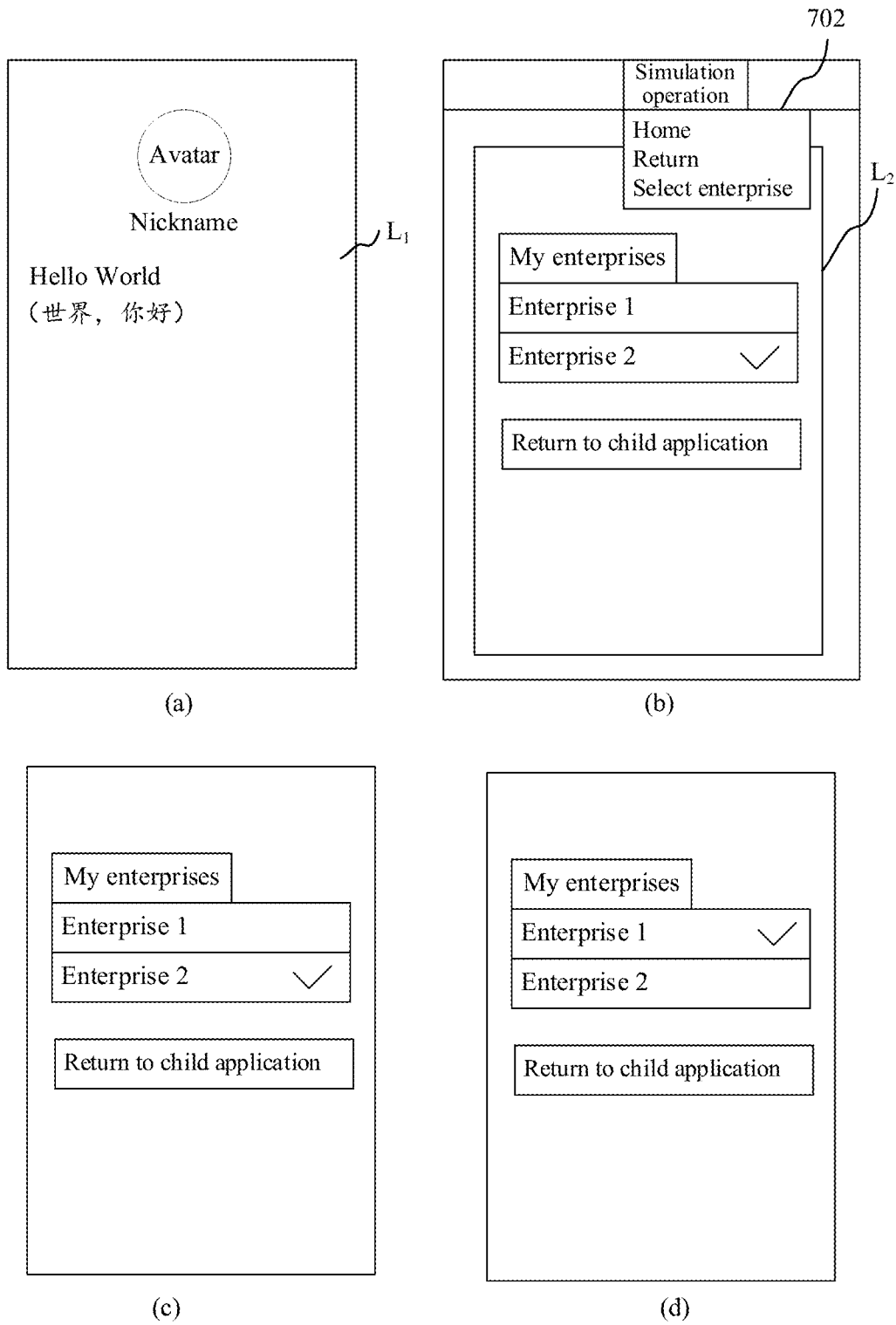
FIG. 7 is a schematic diagram of customized display according to an embodiment.

FIG. 7 is a schematic diagram of customized display according to an embodiment. An example of developing a child application of an enterprise instant messaging application (APP) is used in FIG. 7 for exemplary description. Diagram (a) of FIG. 7 shows an interface $L_1$ of which presentation is simulated by the child application simulator, where "Hello world" in the interface $L_1$ is a welcome message by default, which is translated into Chinese as "世界, 你好!". The user may perform a trigger operation on a simulation operation entry in diagram (b), to trigger display of a simulation operation option set 702. "Home" means a home page, and a "Home" option means an option of simulating an operation of returning to the home page. A "Return" option is an option of simulating an operation of returning to a previous interface, and a "Select enterprise" option is an option of performing an enterprise selection operation in the enterprise instant messaging APP. That the user clicks "Select enterprise" is equivalent to simulating execution of an enterprise selection operation for the enterprise instant messaging client, and the child application simulator plug-in generates an enterprise selection interface $L_2$. The enterprise selection interface $L_2$ covers the interface $L_1$ in diagram (a) for visual display. The enterprise selection interface $L_2$ displays a plurality of selectable enterprise accounts (e.g., an enterprise 1 and an enterprise 2). The enterprise account is equivalent to an identifier of a child application in the enterprise instant messaging application. Diagram (c) and diagram (d) show that the user may perform an account switching operation on the enterprise accounts in the enterprise selection interface. The user may alternatively trigger a "Return to child application" option in the enterprise selection interface, to return to the interface $L_1$ in diagram (a).

In the foregoing embodiment, execution of an operation of the second parent application can be simulated by using the child application simulator plug-in, so that a corresponding interface of the second parent application can be displayed in a display region of the child application simulator. Complex exit and entry operations do not need to be performed, to avoid a waste of computer resources caused by that the computer device receives and responds to complex operations.

In an embodiment, the performing development processing for the child application of the second parent application in the child application running environment includes: monitoring the child application developer tool by using the child application simulator plug-in in the child application running environment; processing, after a call request for a target interface in the child application developer tool is detected by using the child application simulator plug-in, the call request by using the child application simulator plug-in, to obtain a processing result; and returning the processing result as an interface call result by using the child application developer tool.

The target interface is a predesignated interface that needs to be monitored. It may be understood that, the target interface is an interface that requires customized processing when being called. That is, because call processing of the second parent application for the target interface is different from call processing of the first parent application for the target interface, the customized processing needs to be performed.

Application programming interfaces (API) are some predefined functions, and an objective thereof is to provide a capability for an application program and a developer to access a set of routines based on specific software or hardware without accessing source code or understanding details of an internal working mechanism.

In an embodiment, the target interface may include an interface providing user login information. The user login information refers to user information that a user needs to provide when logging in to a child application. In an embodiment, the user login information may include information related to the login such as a nickname and an avatar the user.

It may be understood that, generally, the user login information used by the child application is user login information corresponding to a parent application obtained by calling an interface. However, if the second parent application and the first parent application are different applications, the first parent application and the second parent application may be different in terms of user login information. Therefore, customized processing corresponding to the second parent application needs to be performed on the calling of the interface, to correctly obtain the user login information of the second parent application.

In another embodiment, the target interface may further include an interface used for obtaining personal data (e.g., an address of a user), friend information, and the like of a user. It may be understood that, different parent applications may be different in terms of personal data and friend information of a user. Therefore, the customized processing corresponding to the second parent application needs to be performed on the calling of the interfaces, to obtain correct information. This is only exemplary description herein. The target interface includes, but is not limited to, the listed interfaces.

In an embodiment, during development processing for the child application of the second parent application in the child application running environment, calling of an interface in the child application developer tool is included. The computer device may monitor the calling of the interface in the child application developer tool by using the child application simulator plug-in, and after detecting, by using the child application simulator plug-in, a call request of an interface caller for the target interface in the child application developer tool, the computer device may process the call request by using preset processing logic in the child application simulator plug-in to obtain a processing result. The computer device may return the processing result as an interface call result to a call result receiver by using the child application developer tool.

That is, the interface call result returned by the child application developer tool to the call result receiver is a processing result obtained by processing the call request for the target interface by the child application simulator plug-in.

The interface caller is a party request to call an interface. The call result receiver is a party receiving the interface call result.

It may be understood that, the interface caller and the call result receiver may be different objects.

In an embodiment, the interface caller may be a view layer, and the call result receiver may be a logic layer. In another embodiment, alternatively, the interface caller may be a logic layer, and the call result receiver may be a view layer. It may be understood that, the view layer and the logic layer may communicate with each other by calling the interfaces in the child application developer tool.

In another embodiment, the interface caller and the call result receiver may be a same object, that is, both may be a view layer, or both may be a logic layer.

The view layer (view) can load and display an interface. In an embodiment, the view layer may be a WebView. The WebView can load and display a web page, and may be regarded as a browser.

The logic layer (AppService) is a place in which event logic is processed. It may be understood that, a function of the logic layer is to process data, transmit the processed data to the view layer, and also receive event feedback from the view layer. The view layer may perform a corresponding display update according to the data processed by the logic layer.

It may be understood that, a child application system framework includes the view layer and the logic layer, that is, the view layer and the logic layer are components of the child application. The child application base library loaded in step S208 provides a running environment for the view layer and the logic layer of the child application.

In an embodiment, the logic layer of the child application is a set of JavaScript (js) script files. The view layer of the child application is completed by WeiXin mark language (WXML) and WeiXin style sheet (WXSS) files. In an embodiment, the processing, after a call request for a target interface in the child application developer tool is detected by using the child application simulator plug-in, the call request by using the child application simulator plug-in, to obtain a processing result includes: intercepting, in response to the call request for the target interface in the child application developer tool being detected by using the child application simulator plug-in, the call request by using the child application simulator plug-in, and processing the call request by using the child application simulator plug-in, to obtain the processing result; or intercepting, after the call request for the target interface in the child application developer tool is detected by using the child application simulator plug-in, a result returned by the target interface in response to the call request by using the child application simulator plug-in, and processing the call request by using the child application simulator plug-in, to obtain the processing result.

It may be understood that, intercepting means blocking. Therefore, intercepting a call request means that the call request is not delivered to a target interface any more. Intercepting a result returned by the target interface means that the result returned by the target interface is not notified to the child application developer tool.

In an embodiment, before the child application developer tool distributes the call request to the target interface, the computer device intercepts the call request by using the child application simulator plug-in without notifying the target interface of the call request, where the call request is processed by the child application simulator plug-in, and returns an obtained processing result as an interface call result. The child application developer tool receives the processing result returned by the child application simulator plug-in.

In another embodiment, the computer device may alternatively not perform interception when the child application developer tool distributes the call request to the target interface. In this case, the target interface may process the call request and return a corresponding result. When detecting a result returned by the target interface, the child application simulator plug-in intercepts the returned result, to prevent the result from being transferred to the child application developer tool. The computer device may process the call request for the target interface by using the child application simulator plug-in, to obtain the processing result. Then, the child application simulator plug-in may return the processing result obtained through processing of the child application simulator plug-in to the child application developer tool.

It may be understood that, the entire processing process is transparent to the child application developer tool. That is, the child application developer tool does not learn that the call for the target interface is intercepted. In response to a call request for a non-target interface being detected by the child application simulator plug-in, the child application developer tool may directly transmit the call request to a non-target interface, and directly return an interface call result returned by the non-target interface to the call result receiver.

Figure 8:
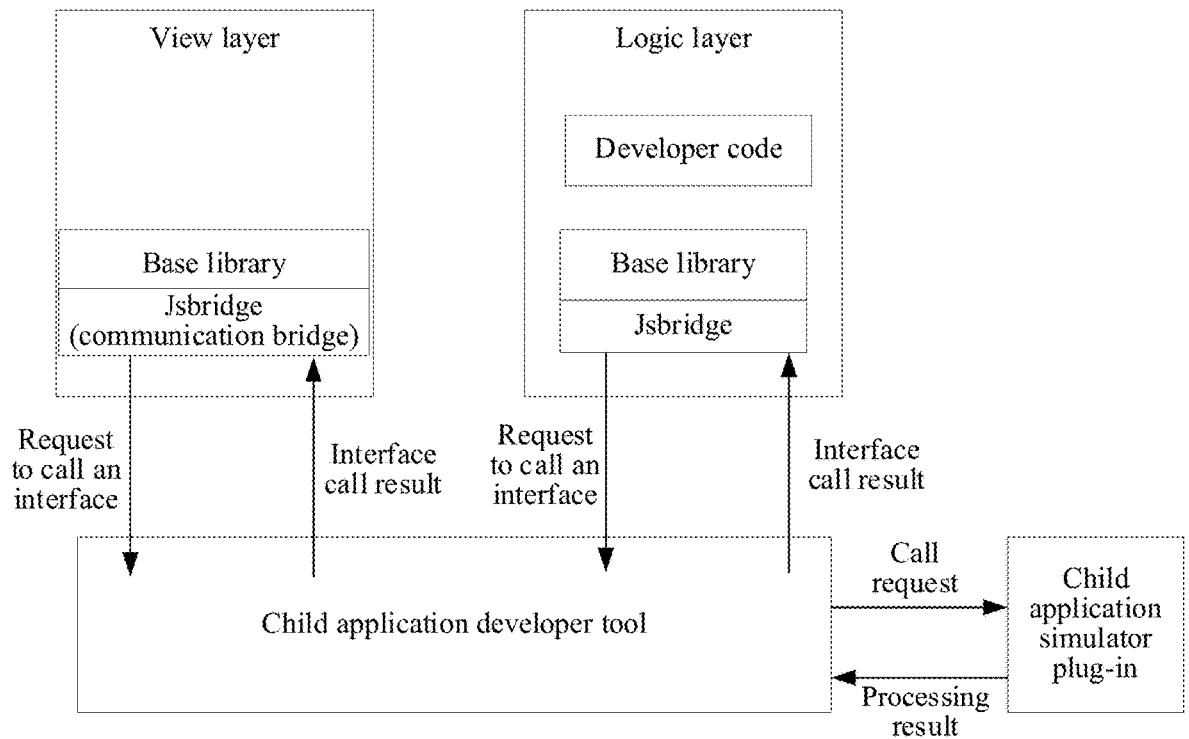
FIG. 8 is a schematic diagram of customized processing on calling of a target interface according to an embodiment.

FIG. 8 is a schematic diagram of customized processing on calling of a target interface according to an embodiment. Referring to FIG. 8, the view layer and the logic layer may both transmit an interface call request to the child application developer tool, and may both receive an interface call result. An example in which the logic layer initiates a call request for the target interface is used for exemplary description. In FIG. 8, the view layer and the logic layer communicate with the child application developer tool through a communication bridge (Jsbridge). It is assumed that, in a scenario in which a user logs in, the logic layer transmits a call request to the target interface in the child application developer tool, and the child application simulator plug-in may intercept and process the call request, to obtain user login information corresponding to the second parent application. The child application simulator plug-in may return the user login information to the child application developer tool, and the child application developer tool may return the user login information to the view layer. It may be understood that, if the child application simulator plug-in does not intercept the call request, the child application developer tool may directly call the target interface to obtain the user login information corresponding to the first parent application, and return the user login information to the view layer for display. The user login information corresponding to the second parent application may be different from the user login information corresponding to the first parent application, for example, may be different in terms of a nickname, an avatar, and the like of a user. Therefore, the customized processing can be implemented on calling of the target interface by using the child application simulator plug-in, to obtain more accurate information.

In an embodiment, after a call request for a target interface in the child application developer tool is detected by using the child application simulator plug-in, the call request is processed by using the child application simulator plug-in, to obtain a processing result, and the processing result is returned as an interface call result by using the child application developer tool. The customized processing is implemented on calling of the interface, so that information that is more adapted to the child application of the second parent application can be obtained during calling of the interface, thereby satisfying some logic in which the second parent application is different from the first parent application. Further, a dedicated child application of the second parent application can be developed more accurately.

In an embodiment, the performing development processing for the child application of the second parent application in the child application running environment further includes: intercepting, in response to occurrence of a target event in the child application developer tool being detected, the target event by using the child application simulator plug-in; performing processing corresponding to the target event by using the child application simulator plug-in; and triggering, after the child application simulator plug-in performs the processing corresponding to the target event, a system event according to the target event by using the child application developer tool.

The target event is a predesignated event that needs to be monitored. The event is an operation that may be recognized by a control. For example, pressing a Confirm button, selecting a radio button or a check box, and the like are all events.

In an embodiment, the target event may include an event that the user clicks Clear buffer. It may be understood that, the target event may alternatively include other events for which the child application simulator plug-in needs to perform corresponding processing.

In an embodiment, the user may perform a corresponding operation on the child application developer tool, to trigger to generate a corresponding event. The computer device may monitor, by using the child application simulator plug-in, an event occurring in the child application developer tool, and intercept, in response to occurrence of a target event in the child application developer tool being detected by using the child application simulator plug-in, the target event by using the child application simulator plug-in, so that the target event is not transmitted to an upper layer object by the child application developer tool. The computer device may perform processing corresponding to the target event by using the child application simulator plug-in. After the child application simulator plug-in performs the processing corresponding to the target event, the computer device may transmit the target event to an upper layer by using the child application developer tool, to trigger a system event of the child application.

The system event is an event that the child application needs to perform. That is, the system event is an event that the view layer and the logic layer in the child application need to perform.

It may be understood that, the computer device may transmit, after the child application simulator plug-in performs the processing corresponding to the target event, the target event to the view layer and the logic layer by using the child application developer tool.

Figure 9:
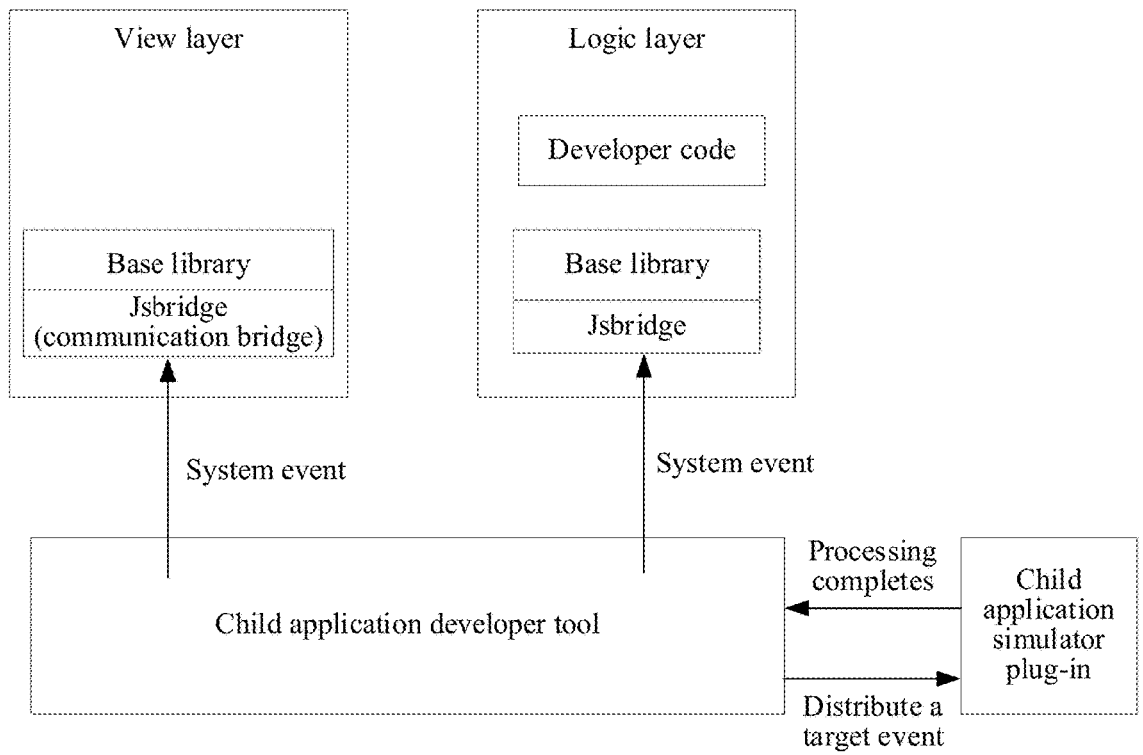
FIG. 9 is a schematic diagram of customized processing on a target event according to an embodiment.

FIG. 9 is a schematic diagram of customized processing on a target event according to an embodiment. An example in which the target event is a clear-buffer event is used for exemplary description. The child application simulator plug-in may monitor the child application developer tool, and in response to the clear-buffer event occurring, the child application simulator plug-in may intercept the event, and also perform clear-buffer processing. After clearing a buffer, the child application simulator plug-in may notify the child application developer tool, and the child application developer tool may continue to transmit the clear-buffer event to the view layer and the logic layer, to trigger the view layer and the logic layer to perform the clear-buffer processing. It may be understood that, when a non-target event occurs in the child application developer tool, the child application developer tool may directly transmit the non-target event to the view layer and the logic layer.

In the foregoing embodiment, customized processing on data transmission is implemented by monitoring events occurred in the developer tool, so that corresponding processing can be also performed in the child application simulator plug-in, to ensure the consistency of data. Further, a dedicated child application of the second parent application can be developed more accurately.

In an embodiment, the configuration file includes information about a child application base library version of the second parent application. The method further includes:

displaying a set of base library version options in the interface of the child application developer tool according to the information about the child application base library version; obtaining a target base library version option selected from the set; obtaining a target child application base library corresponding to the target base library version option from the configuration file of the child application simulator plug-in by using the child application developer tool; and switching the current child application running environment to a child application running environment created by loading the target child application base library.

The information about the child application base library version of the second parent application refers to information describing the base library version of the child application of the second parent application. The target base library version is a base library version selected by the user, that is, a base library version that the user wants to use.

In an embodiment, the computer device may display the set of base library version options in the interface of the child application developer tool. The user may select a target base library version option from the set. The computer device may obtain a target child application base library corresponding to the target base library version option from the configuration file of the child application simulator plug-in by using the child application developer tool. Therefore, the computer device may load the target child application base library, to create a corresponding child application running environment, and switch the current child application running environment to the newly created child application running environment.

It may be understood that, when creating a child application running environment for the first time, the computer device may obtain and load a child application base library that corresponds to a base library version by default, to create a child application running environment of the second parent application. Subsequently, the user may flexibly select different base library versions, to flexibly switch child application running environments, to perform development adjustment for different versions.

In an embodiment, the computer device may display a version selection entry in the interface of the child application developer tool, and the user performs a trigger operation on the version selection entry, to display a set of base library version options. The version selection entry is configured to display a set of base library version options after being triggered.

In an embodiment, a toolbar of the interface of the child application developer tool includes an option for triggering to display the version selection entry. After the user performs a trigger operation on the option, the computer device may display, in response to the trigger operation, the version selection entry in the interface of the child application developer tool.

Figure 10:
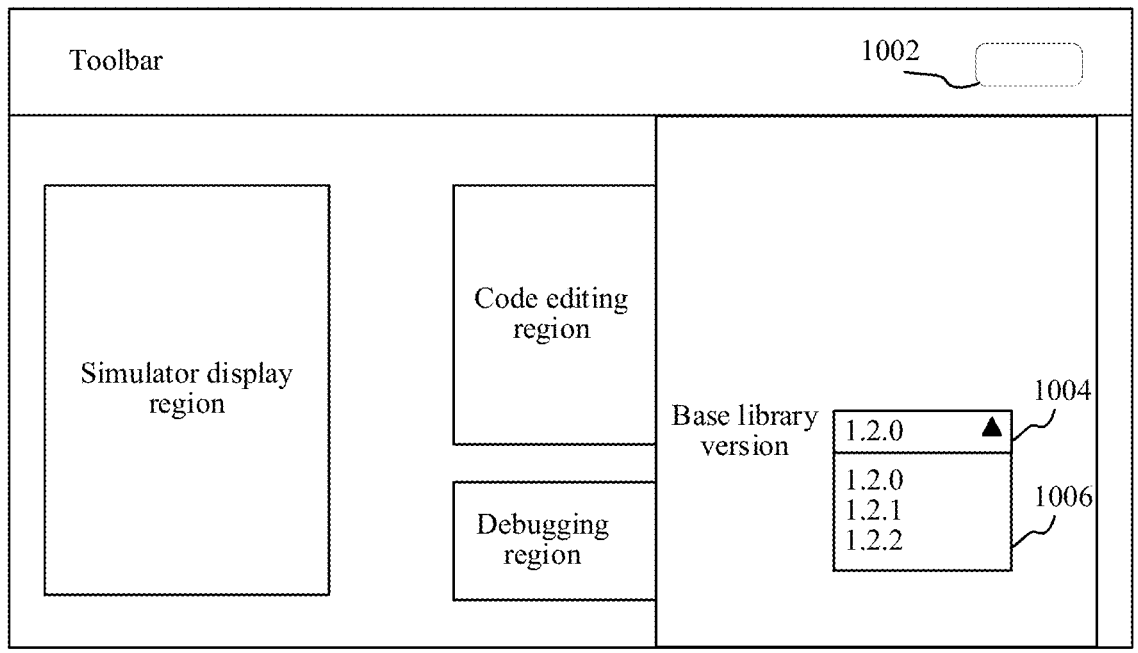
FIG. 10 is a diagram of a base library version selection interface according to an embodiment.

FIG. 10 is a diagram of a base library version selection interface according to an embodiment. Referring to FIG. 10, after a user selects an option 1002 in a toolbar, the computer device may display a version selection entry 1004 in the interface of the child application developer tool, the user may trigger the version selection entry 1004, and the computer device then displays a set 1006 of base library version options. The user may select a target base library version option from the set. The user in FIG. 10 selects a version 1.2.0.

In the foregoing embodiments, different base library versions are selected, so that the compatibility and debugging processing of different versions are achieved. In addition, by directly selecting a target base library version from the set of the base library version options displayed in the interface, child application running environments corresponding to different versions of base libraries may be switched rapidly, thereby avoiding complex operations and improving the development efficiency. In addition, because complex operations are not needed, a waste of computer resources caused by that the computer device receives and responds to complex operations can be avoided.

Figure 11:
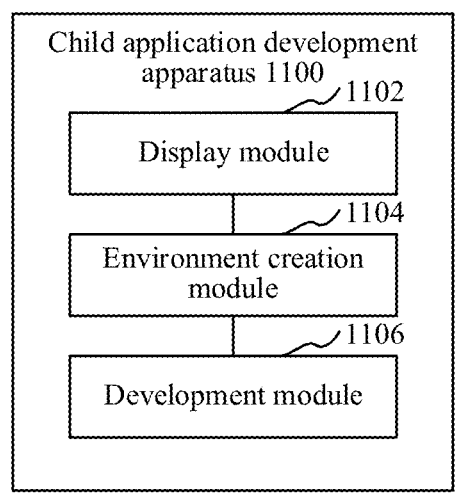
FIG. 11 is a block diagram of a child application development apparatus according to another embodiment.

As shown in FIG. 11, in an embodiment, a child application development apparatus 1100 is provided. The apparatus 1100 includes a display module 1102, an environment creation module 1104, and a development module 1106. One or more modules of the apparatus 1100 can be implemented by processing circuitry, software, or a combination thereof, for example.

The display module 1102 is configured to display an interface of a child application developer tool, the child application developer tool being obtained by performing customized extension corresponding to development processing for a child application of a second parent application based on a native child application developer tool of a first parent application, the second parent application being different from the first parent application. The environment creation module 1104 is configured to receive a development trigger instruction for the child application of the second parent application through the interface; obtain, in response to the development trigger instruction, a child application base library of the second parent application by using the child application developer tool; and create a child application running environment of the second parent application by loading the child application base library. The development module 1106 is configured to perform development processing for the child application of the second parent application in the child application running environment.

In an embodiment, the display module 1102 is further configured to display a mode option set in the interface, the mode option set including an option of a child application development mode of the second parent application; and generate, in response to a selection operation on the option in the mode option set being detected, the development trigger instruction for the child application of the second parent application.

In an embodiment, the child application developer tool is obtained after installing a child application simulator plug-in of the second parent application in the native child application developer tool of the first parent application. The child application simulator plug-in is configured to implement customized development processing for the child application of the second parent application. The environment creation module 1104 is further configured to select the child application base library of the second parent application from a configuration file of the child application simulator plug-in by using the child application developer tool.

In an embodiment, the display module 1102 is further configured to display a plug-in management interface provided by the native child application developer tool of the first parent application, the plug-in management interface including an identifier of the child application simulator plug-in of the second parent application.

Figure 12:
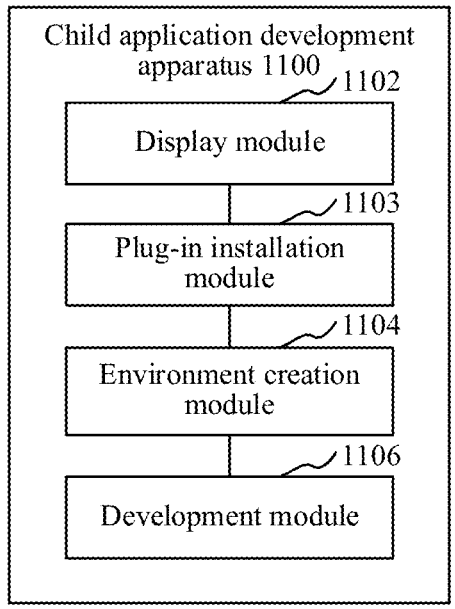
FIG. 12 is a block diagram of a child application development apparatus according to another embodiment.

As shown in FIG. 12, in this embodiment, the apparatus 1100 further includes: a plug-in installation module 1103, configured to install, in response to a trigger operation on the identifier being detected, the child application simulator plug-in corresponding to the identifier to the native child application developer tool.

In an embodiment, the native child application developer tool includes a child application simulator. The development module 1106 is further configured to simulate, in a simulator display region of the child application developer tool by using the child application simulator, an interface presented in a case that a child application currently developed is run on the second parent application based on the child application running environment; generating, in response to a preset simulation operation performed for the child application simulator being detected, a simulation interface corresponding to the preset simulation operation by using the child application simulator plug-in; and covering, for display, the simulation interface on the interface of which presentation is simulated.

In an embodiment, the preset simulation operation includes simulating execution of an operation on the second parent application. The development module 1106 is further configured to simulate, in response to the simulating execution of the operation on the second parent application being detected by using the child application simulator plug-in, display of an interface of the second parent application corresponding to the detected operation by using the child application simulator plug-in.

In an embodiment, the development module 1106 is further configured to monitor the child application developer tool by using the child application simulator plug-in in the child application running environment; process, after a call request for a target interface in the child application developer tool is detected, the call request by using the child application simulator plug-in, to obtain a processing result; and return the processing result as an interface call result by using the child application developer tool.

In an embodiment, the development module 1106 is further configured to intercept, in response to the call request for the target interface in the child application developer tool being detected, the call request by using the child application simulator plug-in, and processing the call request by using the child application simulator plug-in, to obtain the processing result; or intercept, by using the child application simulator plug-in after the call request for the target interface in the child application developer tool is detected, a result returned by the target interface in response to the call request, and process the call request by using the child application simulator plug-in, to obtain the processing result.

In an embodiment, the development module 1106 is further configured to monitor the child application developer tool by using the child application simulator plug-in in the child application running environment; intercept, in response to occurrence of a target event in the child application developer tool being detected, the target event by using the child application simulator plug-in; perform processing corresponding to the target event by using the child application simulator plug-in; and trigger, after the child application simulator plug-in performs the processing corresponding to the target event, a system event according to the target event by using the child application developer tool.

In an embodiment, the configuration file includes information about a child application base library version of the second parent application. The display module 1102 is further configured to display a set of base library version options in the interface of the child application developer tool according to the information; and obtain a target base library version option selected from the set. The environment creation module 1104 is further configured to obtain a target child application base library corresponding to the target base library version option from the configuration file of the child application simulator plug-in by using the child application developer tool; and switch the current child application running environment to a child application running environment created by loading the target child application base library.

Figure 13:
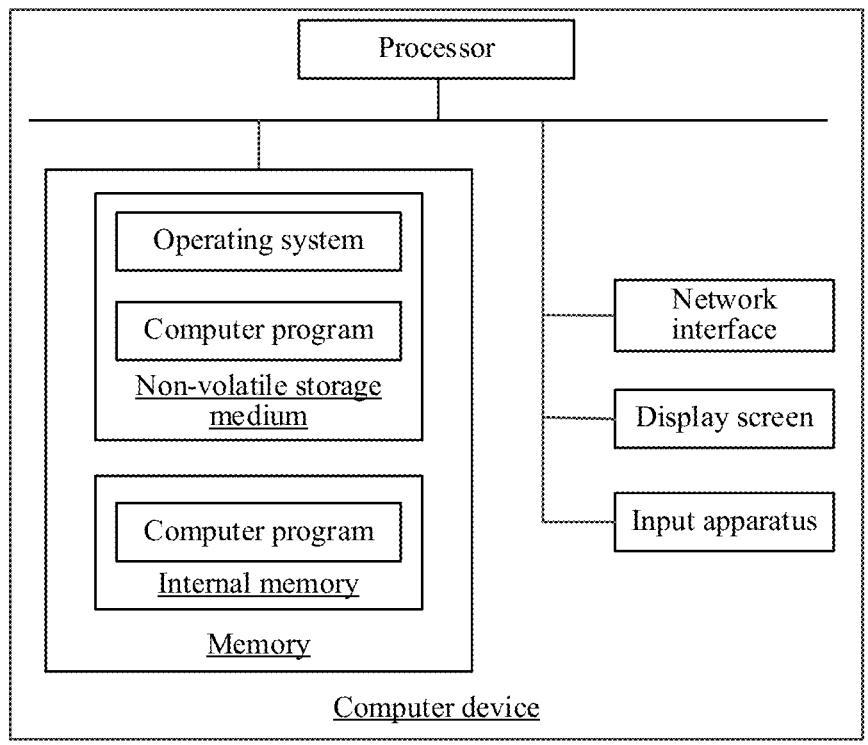
FIG. 13 is a block diagram of a computer device according to an embodiment.

FIG. 13 is a schematic diagram of an internal structure of a computer device according to an embodiment. Referring to FIG. 13, the computer device may be the terminal 110 in FIG. 1. The computer device includes processing circuitry (e.g., a processor), a memory, a network interface, a display screen, and an input apparatus that are connected by using a system bus. The memory includes a non-volatile storage medium and an internal memory. The non-volatile storage medium of the computer device may store an operating system and a computer program. The computer program, when executed, may cause the processor to perform a child application development method. The processor of the computer device is configured to provide calculation and control capabilities, to support running of the entire computer device. The internal memory may store a computer program. The computer program, when executed by the processor, may cause the processor to perform a child application development method. The network interface of the computer device is configured to perform network communication. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 13 is only a block diagram of a part of a structure related to a solution of this disclosure and does not limit the computer device to which the solution of this disclosure is applied. Specifically, the computer device may include more or fewer members than those in the drawings, or include a combination of some members, or include different member layouts.

In an embodiment, the child application development apparatus provided in this disclosure may be implemented in a form of a computer program. The computer program may be run on the computer device shown in FIG. 13, and the non-volatile storage medium of the computer device may store program modules constituting the child application development apparatus, for example, the display module 1102, the environment creation module 1104, and the development module 1106 shown in FIG. 11. The computer program constituted by the program modules is used for causing the computer device to perform the operations in the child application development method in the embodiments of this disclosure. For example, the computer device may display an interface of a child application developer tool by using the display module 1102 in the child application development apparatus 1100 shown in FIG. 11. The child application developer tool is obtained by performing customized extension corresponding to development processing for a child application of a second parent application based on a native child application developer tool of a first parent application. The second parent application is different from the first parent application. The computer device may receive a development trigger instruction for the child application of the second parent application through the interface by using the environment creation module 1104; obtain, in response to the development trigger instruction, a child application base library of the second parent application by using the child application developer tool; and create a child application running environment of the second parent application by loading the child application base library. The computer device may perform development processing for the child application of the second parent application in the child application running environment by using the development module 1106.

In an embodiment, a computer device is provided, including a memory and a processor, the memory storing a computer program, the computer program, when executed by the processor, causing the processor to perform the following operations: displaying an interface of a child application developer tool, the child application developer tool being obtained by performing customized extension corresponding to development processing for a child application of a second parent application based on a native child application developer tool of a first parent application, the second parent application being different from the first parent application; receiving a development trigger instruction for the child application of the second parent application through the interface; obtaining, in response to the development trigger instruction, a child application base library of the second parent application by using the child application developer tool; and creating a child application running environment of the second parent application by loading the child application base library; and performing development processing for the child application of the second parent application in the child application running environment.

In an embodiment, the computer program, when executed by the processor, causes the processor to perform the following operations: displaying a mode option set in the interface, the mode option set including an option of a child application development mode of the second parent application; and generating, in response to a selection operation on the option in the mode option set being detected, the development trigger instruction for the child application of the second parent application.

In an embodiment, the child application developer tool is obtained after installing a child application simulator plug-in of the second parent application in the native child application developer tool of the first parent application. The child application simulator plug-in is configured to implement customized development processing for the child application of the second parent application. The computer program, when executed by the processor, causes the processor to perform the following operation: selecting the child application base library of the second parent application from a configuration file of the child application simulator plug-in by using the child application developer tool.

In an embodiment, the computer program, when executed by the processor, causes the processor to perform the following operations: displaying a plug-in management interface provided by the native child application developer tool of the first parent application, the plug-in management interface including an identifier of the child application simulator plug-in of the second parent application; and installing, in response to a trigger operation on the identifier being detected, the child application simulator plug-in corresponding to the identifier to the native child application developer tool, to obtain the child application developer tool.

In an embodiment, the native child application developer tool includes a child application simulator. The computer program, when executed by the processor, causes the processor to perform the following operations: simulating, by using the child application simulator, an interface presented in a simulator display region of the child application developer tool in a case that a child application currently developed is run on the second parent application based on the child application running environment; generating, in response to a preset simulation operation performed for the child application simulator being detected, a simulation interface corresponding to the preset simulation operation by using the child application simulator plug-in; and covering, for display, the simulation interface on the interface of which presentation is simulated.

In an embodiment, the preset simulation operation includes simulating execution of an operation on the second parent application. The computer program, when executed by the processor, causes the processor to perform the following operation: simulating, in response to the simulating execution of the operation on the second parent application being detected by using the child application simulator plug-in, display of an interface of the second parent application corresponding to the detected operation by using the child application simulator plug-in.

In an embodiment, the computer program, when executed by the processor, causes the processor to perform the following operations: monitoring the child application developer tool by using the child application simulator plug-in in the child application running environment; processing, after a call request for a target interface in the child application developer tool is detected, the call request by using the child application simulator plug-in, to obtain a processing result; and returning the processing result as an interface call result by using the child application developer tool.

In an embodiment, the computer program, when executed by the processor, causes the processor to perform the following operation: intercepting, in response to the call request for the target interface in the child application developer tool being detected, the call request by using the child application simulator plug-in, and processing the call request by using the child application simulator plug-in, to obtain the processing result; or intercepting, by using the child application simulator plug-in after the call request for the target interface in the child application developer tool is detected, a result returned by the target interface in response to the call request, and process the call request by using the child application simulator plug-in, to obtain the processing result.

In an embodiment, the computer program, when executed by the processor, causes the processor to perform the following operations: monitoring the child application developer tool by using the child application simulator plug-in in the child application running environment; intercepting, in response to occurrence of a target event in the child application developer tool being detected, the target event by using the child application simulator plug-in; performing processing corresponding to the target event by using the child application simulator plug-in; and triggering, after the child application simulator plug-in performs the processing corresponding to the target event, a system event according to the target event by using the child application developer tool.

In an embodiment, the configuration file includes information about a child application base library version of the second parent application. The computer program, when executed by the processor, causes the processor to perform the following operations: displaying a set of base library version options in the interface of the child application developer tool according to the information; obtaining a target base library version option selected from the set; obtaining a target child application base library corresponding to the target base library version option from the configuration file of the child application simulator plug-in by using the child application developer tool; and switching the current child application running environment to a child application running environment created by loading the target child application base library.

In an embodiment, a computer-readable storage medium, such as a non-transitory computer-readable storage medium, is provided, storing a computer program, the computer program, when executed by a processor, causing the processor to perform the following steps: displaying an interface of a child application developer tool, the child application developer tool being obtained by performing customized extension corresponding to development processing for a child application of a second parent application based on a native child application developer tool of a first parent application, the second parent application being different from the first parent application; receiving a development trigger instruction for the child application of the second parent application through the interface; obtaining, in response to the development trigger instruction, a child application base library of the second parent application by using the child application developer tool; and creating a child application running environment of the second parent application by loading the child application base library; and performing development processing for the child application of the second parent application in the child application running environment.

In an embodiment, the computer program, when executed by the processor, causes the processor to perform the following operations: displaying a mode option set in the interface, the mode option set including an option of a child application development mode of the second parent application; and generating, in response to a selection operation on the option in the mode option set being detected, the development trigger instruction for the child application of the second parent application.

In an embodiment, the child application developer tool is obtained after installing a child application simulator plug-in of the second parent application in the native child application developer tool of the first parent application. The child application simulator plug-in is configured to implement customized development processing for the child application of the second parent application. The computer program, when executed by the processor, causes the processor to perform the following operation: selecting the child application base library of the second parent application from a configuration file of the child application simulator plug-in by using the child application developer tool.

In an embodiment, the computer program, when executed by the processor, causes the processor to perform the following operations: displaying a plug-in management interface provided by the native child application developer tool of the first parent application, the plug-in management interface including an identifier of the child application simulator plug-in of the second parent application; and installing, in response to a trigger operation on the identifier being detected, the child application simulator plug-in corresponding to the identifier to the native child application developer tool, to obtain the child application developer tool.

In an embodiment, the native child application developer tool includes a child application simulator. The computer program, when executed by the processor, causes the processor to perform the following operations: simulating, by using the child application simulator, an interface presented in a simulator display region of the child application developer tool in a case that a child application currently developed is run on the second parent application based on the child application running environment; generating, in response to a preset simulation operation performed for the child application simulator being detected, a simulation interface corresponding to the preset simulation operation by using the child application simulator plug-in; and covering, for display, the simulation interface on the interface of which presentation is simulated.

In an embodiment, the preset simulation operation includes simulating execution of an operation on the second parent application. The computer program, when executed by the processor, causes the processor to perform the following operation: simulating, in response to the simulating execution of the operation on the second parent application being detected by using the child application simulator plug-in, display of an interface of the second parent application corresponding to the detected operation by using the child application simulator plug-in.

In an embodiment, the computer program, when executed by the processor, causes the processor to perform the following operations: monitoring the child application developer tool by using the child application simulator plug-in in the child application running environment; processing, after a call request for a target interface in the child application developer tool is detected, the call request by using the child application simulator plug-in, to obtain a processing result; and returning the processing result as an interface call result by using the child application developer tool.

In an embodiment, the computer program, when executed by the processor, causes the processor to perform the following operation: intercepting, in response to the call request for the target interface in the child application developer tool being detected, the call request by using the child application simulator plug-in, and processing the call request by using the child application simulator plug-in, to obtain the processing result; or intercepting, by using the child application simulator plug-in after the call request for the target interface in the child application developer tool is detected, a result returned by the target interface in response to the call request, and process the call request by using the child application simulator plug-in, to obtain the processing result.

In an embodiment, the computer program, when executed by the processor, causes the processor to perform the following operations: monitoring the child application developer tool by using the child application simulator plug-in in the child application running environment; intercepting, in response to occurrence of a target event in the child application developer tool being detected, the target event by using the child application simulator plug-in; performing processing corresponding to the target event by using the child application simulator plug-in; and triggering, after the child application simulator plug-in performs the processing corresponding to the target event, a system event according to the target event by using the child application developer tool.

In an embodiment, the configuration file includes information about a child application base library version of the second parent application. The computer program, when executed by the processor, causes the processor to perform the following operations: displaying a set of base library version options in the interface of the child application developer tool according to the information; obtaining a target base library version option selected from the set; obtaining a target child application base library corresponding to the target base library version option from the configuration file of the child application simulator plug-in by using the child application developer tool; and switching the current child application running environment to a child application running environment created by loading the target child application base library.

"First", "second", "third", and the like in the embodiments of this disclosure are merely used for distinction, and are not intended to constitute a limitation in aspects of a size, an order, subordination, or the like.

It is to be understood that although the steps in the embodiments of this disclosure are not necessarily performed sequentially in a sequence indicated by step numbers. Unless otherwise explicitly specified in this disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The technical features in the foregoing embodiments may be combined in various manners. For concise description, not all possible combinations of the technical features in the embodiments are described. However, provided that combinations of the technical features do not conflict with each other, the combinations of the technical features are considered as falling within the scope described in this specification.

The foregoing embodiments merely express several implementations of this disclosure. The descriptions thereof are relatively specific and detailed, but are not to be understood as limitations to the scope of this disclosure. For a person of ordinary skill in the art, several transformations and improvements can be made without departing from the idea of this disclosure. These transformations and improvements belong to the protection scope of this disclosure.

What is claimed is:

1. A child application development method, the method comprising:
    displaying an interface of a child application developer tool, the child application developer tool being a native child application developer tool including a first child application development mode in which a first running environment of a first parent application is provided, the native child application developer tool being configured with an extension of a second child application development mode in which a second running environment of a second parent application is provided based on installation of a plug-in that provides the extension of the second parent application, the second parent application being different from the first parent application and the first running environment being different from the second running environment;
    receiving a development instruction that indicates a user selection of the second child application development mode of the second parent application via the interface;
    obtaining, in response to the development instruction, a child application base library of the second parent application via the child application developer tool;
    creating a child application running environment of the second parent application by loading the child application base library; and
    performing, by processing circuitry, development processing for a child application of the second parent application in the child application running environment, the development processing including development code editing, development code debugging, and program releasing.

2. The method according to claim 1, wherein the receiving comprises:
    displaying a mode option set in the interface, the mode option set including an option of the second child application development mode of the second parent application; and
    generating, in response to the user selection of the option in the mode option set, the development instruction for the child application of the second parent application.

3. The method according to claim 1, wherein
    the plug-in that provides the extension of the second parent application is a child application simulator plug-in of the second parent application,
    the child application developer tool is obtained after installing the child application simulator plug-in of the second parent application in the native child application developer tool of the first parent application,
    the child application simulator plug-in is configured to implement the development processing for the child application of the second parent application, and
    the obtaining includes selecting the child application base library of the second parent application from a configuration file of the child application simulator plug-in via the child application developer tool.

4. The method according to claim 3, wherein before the displaying, the method further comprises:
    displaying a plug-in management interface provided by the native child application developer tool of the first parent application, the plug-in management interface including an identifier of the child application simulator plug-in of the second parent application; and
    installing, in response to a user selection of the identifier, the child application simulator plug-in corresponding to the identifier in the native child application developer tool, to configure the child application developer tool.

5. The method according to claim 3, wherein
    the native child application developer tool includes a child application simulator, and
    the performing includes:
        simulating, via the child application simulator, an interface presented in a simulator display region of the child application developer tool when the child application being developed is run on the second parent application based on the child application running environment;

generating, in response to a user selection of a preset simulation operation performed for the child application simulator, a simulation interface corresponding to the preset simulation operation via the child application simulator plug-in; and covering, for display, the simulation interface on the interface presented in the simulator display region.

6. The method according to claim 5, wherein the preset simulation operation includes simulating execution of an operation on the second parent application; and the generating the simulation interface corresponding to the preset simulation operation includes simulating, in response to the simulating execution of the operation on the second parent application being detected via the child application simulator plug-in, display of an interface of the second parent application corresponding to the detected operation via the child application simulator plug-in.

7. The method according to claim 3, wherein the performing comprises:

monitoring the child application developer tool via the child application simulator plug-in in the child application running environment;

processing, after a call request for a target interface in the child application developer tool is detected, the call request via the child application simulator plug-in, to obtain a processing result; and returning the processing result as an interface call result via the child application developer tool.

8. The method according to claim 7, wherein the processing comprises:

intercepting, in response to the call request for the target interface in the child application developer tool being detected, at least one of the call request via the child application simulator plug-in or a result returned by the target interface in response to the call request; and processing the call request via the child application simulator plug-in, to obtain the processing result.

9. The method according to claim 3, wherein the performing comprises:

monitoring the child application developer tool via the child application simulator plug-in in the child application running environment;

intercepting, in response to occurrence of a target event in the child application developer tool being detected, the target event via the child application simulator plug-in;

performing processing corresponding to the target event via the child application simulator plug-in; and triggering, after the child application simulator plug-in performs the processing corresponding to the target event, a system event according to the target event via the child application developer tool.

10. The method according to claim 3, wherein the configuration file includes version information of a child application base library version of the second parent application, and the method further includes:

displaying a set of base library version options in the interface of the child application developer tool according to the version information;

obtaining a target base library version option selected from the set of base library version options;

obtaining a target child application base library corresponding to the target base library version option from the configuration file of the child application simulator plug-in via the child application developer tool; and switching to a child application running environment created by loading the target child application base library corresponding to the target base library version option.

11. A child application development apparatus, comprising:

processing circuitry configured to:

display an interface of a child application developer tool, the child application developer tool being a native child application developer tool including a first child application development mode in which a first running environment of a first parent application is provided, the native child application developer tool being configured with an extension of a second child application development mode in which a second running environment of a second parent application is provided based on installation of a plug-in that provides the extension of the second parent application, the second parent application being different from the first parent application and the first running environment being different from the second running environment;

receive a development instruction that indicates a user selection of the second child application development mode of the second parent application via the interface;

obtain, in response to the development instruction, a child application base library of the second parent application via the child application developer tool;

create a child application running environment of the second parent application by loading the child application base library; and perform development processing for a child application of the second parent application in the child application running environment, the development processing including development code editing, development code debugging, and program releasing.

12. The apparatus according to claim 11, wherein the processing circuitry is configured to:

display a mode option set in the interface, the mode option set including an option of the second child application development mode of the second parent application; and generate, in response to the user selection of the option in the mode option set, the development instruction for the child application of the second parent application.

13. The apparatus according to claim 11, wherein the plug-in that provides the extension of the second parent application is a child application simulator plug-in of the second parent application, the child application developer tool is obtained after the child application simulator plug-in of the second parent application is installed in the native child application developer tool of the first parent application, the child application simulator plug-in is configured to implement the development processing for the child application of the second parent application, and the processing circuitry is configured to select the child application base library of the second parent application from a configuration file of the child application simulator plug-in via the child application developer tool.

14. The apparatus according to claim 13, wherein the processing circuitry is configured to:
before the interface is displayed,
display a plug-in management interface provided by the native child application developer tool of the first parent application, the plug-in management interface including an identifier of the child application simulator plug-in of the second parent application; and
install, in response to a user selection of the identifier, the child application simulator plug-in corresponding to the identifier in the native child application developer tool, to configure the child application developer tool.

15. The apparatus according to claim 13, wherein
the native child application developer tool includes a child application simulator, and
the processing circuitry is configured to:
simulate, via the child application simulator, an interface presented in a simulator display region of the child application developer tool when the child application being developed is run on the second parent application based on the child application running environment;
generate, in response to a user selection of a preset simulation operation performed for the child application simulator, a simulation interface corresponding to the preset simulation operation via the child application simulator plug-in; and
cover, for display, the simulation interface on the interface presented in the simulator display region.

16. The apparatus according to claim 15, wherein
the preset simulation operation includes simulating execution of an operation on the second parent application, and
the processing circuitry is configured to simulate, in response to the simulating execution of the operation on the second parent application being detected via the child application simulator plug-in, display of an interface of the second parent application corresponding to the detected operation via the child application simulator plug-in.

17. The apparatus according to claim 13, wherein the processing circuitry is configured to:
monitor the child application developer tool via the child application simulator plug-in in the child application running environment;
process, after a call request for a target interface in the child application developer tool is detected, the call request via the child application simulator plug-in, to obtain a processing result; and
return the processing result as an interface call result via the child application developer tool.

18. The apparatus according to claim 17, wherein the processing circuitry is configured to:
intercept, in response to the call request for the target interface in the child application developer tool being detected, at least one of the call request via the child application simulator plug-in or a result returned by the target interface in response to the call request; and
process the call request via the child application simulator plug-in, to obtain the processing result.

19. The apparatus according to claim 13, wherein the processing circuitry is configured to:
monitor the child application developer tool via the child application simulator plug-in in the child application running environment;
intercept, in response to occurrence of a target event in the child application developer tool being detected, the target event via the child application simulator plug-in;
perform processing corresponding to the target event via the child application simulator plug-in; and
trigger, after the child application simulator plug-in performs the processing corresponding to the target event, a system event according to the target event via the child application developer tool.

20. A non-transitory computer-readable storage medium, storing instructions which when executed by a processor cause the processor to perform:
displaying an interface of a child application developer tool, the child application developer tool being a native child application developer tool including a first child application development mode in which a first running environment of a first parent application is provided, the native child application developer tool being configured with an extension of a second child application development mode in which a second running environment of a second parent application is provided based on installation of a plug-in that provides the extension of the second parent application, the second parent application being different from the first parent application and the first running environment being different from the second running environment;
receiving a development instruction that indicates a user selection of the second child application development mode of the second parent application via the interface;
obtaining, in response to the development instruction, a child application base library of the second parent application via the child application developer tool;
creating a child application running environment of the second parent application by loading the child application base library; and
performing development processing for a child application of the second parent application in the child application running environment, the development processing including development code editing, development code debugging, and program releasing.

* * * * *